2,151,790

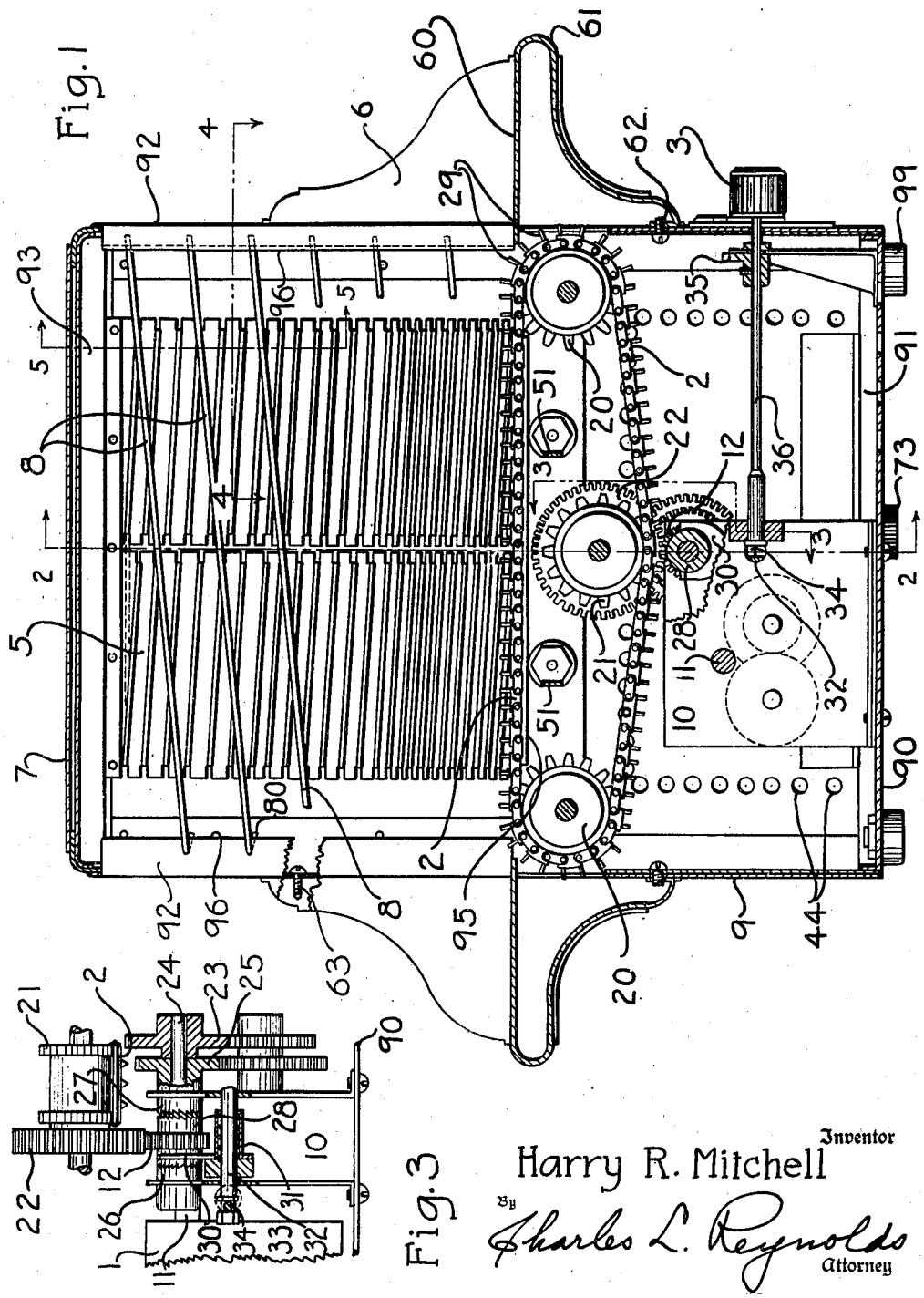

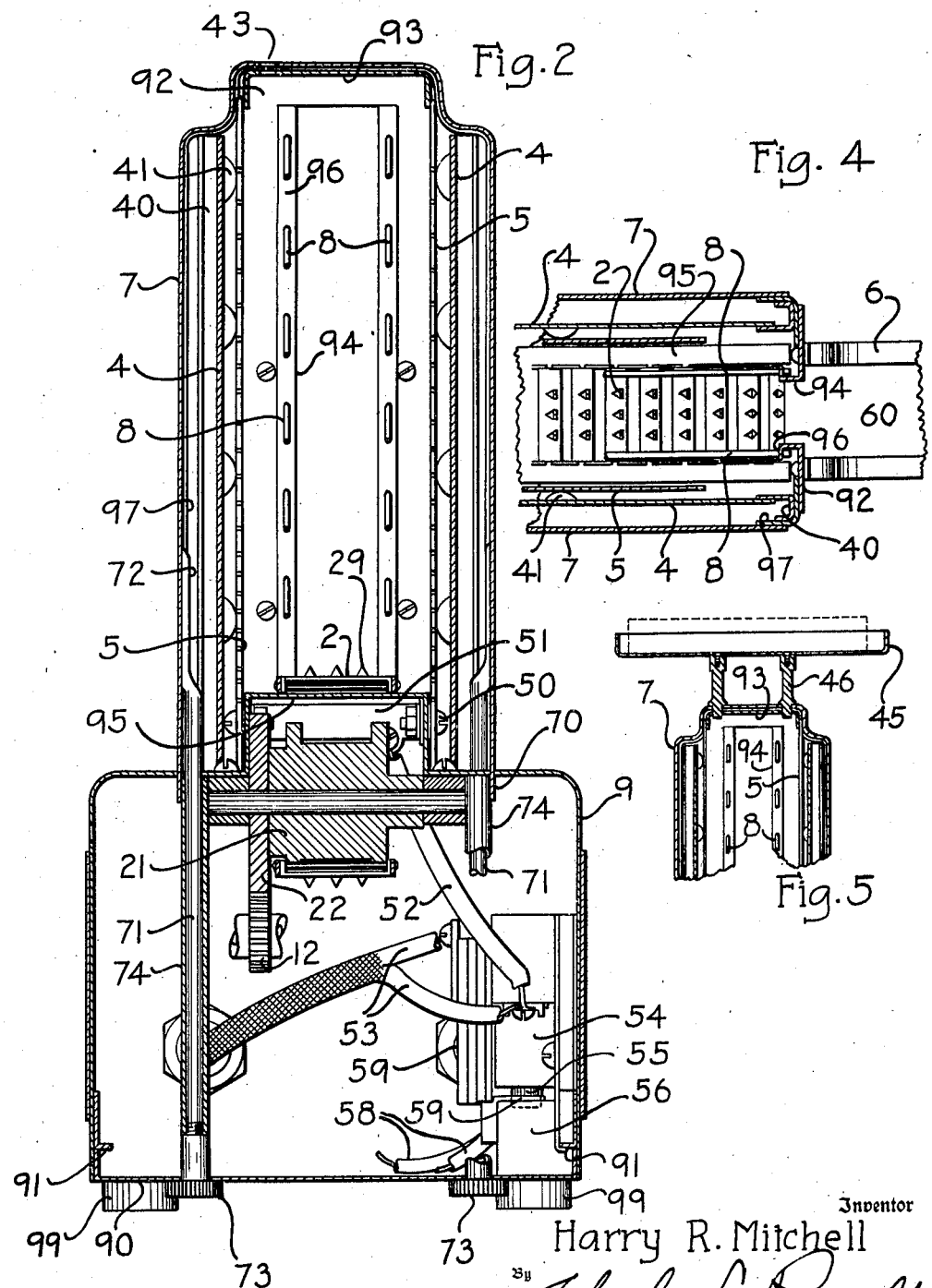
March 28, 1939. H. R. MITCHELL 2,151,790
ELECTRIC TOASTER
Filed April 13, 1937 2 Sheets-Sheet 2
Inventor
Harry R. Mitchell
By Charles L. Reynolds
Attorney Patented Mar. 28, 1939

UNITED STATES PATENT OFFICE 2,151,790

ELECTRIC TOASTER

Harry R. Mitchell, Bremerton, Wash., assignor of one-half to Douglas G. Smith, Mercer Island, Wash.

Application April 13, 1937, Serial No. 136,616

8 Claims. (Cl. 219—19)

My invention relates to a bread toaster, and it is the general object of my invention to improve the construction of such toasters generally, and more particularly to provide a toaster into which slices of bread can be fed to pass automatically through the toaster, remaining in for a given period of time, finally to emerge at a different point, completely and properly toasted.

It is an important object that the degree of toasting be subject to accurate control, to which end it is an object to vary the time of exposure of the slice to the heat by simple, reliable, and readily controllable mechanical means.

It is a further object to simplify the construction of toasters of this general class, to the end that they may (a) be made cheaply, (b) that the parts necessary to be serviced by readily accessible, (c) that the parts most subject to the heat be suitably insulated or protected against heat, and ventilated for the escape of excess heat, and in general to make a toaster of this type which shall be of rugged construction, and readily assembled and disassembled at least to the point necessary for inspection and servicing.

It is a further object to provide in a toaster of this type a conveyor having means such as spikes to positively engage an edge of the slice, and also having means inherently operative in cooperation with the spikes and the remainder of the toaster to press the slice downward into more secure engagement with the spikes, to the end that the slice will pass through the toaster in the required time, and will not stick within nor fail to feed through the toaster.

With these and other objects in mind, as will appear more specifically hereafter, my invention comprises the novel combination and arrangement of the parts thereof, as shown in the accompanying drawings, described in this specification, and as will be more particularly defined by the claims which terminate the same.

In the accompanying drawings I have shown my invention embodied in a toaster of the form now preferred by me, and of a type suitable for domestic use, it being understood, however, that various changes may be made in the form, arrangement, and proportion of parts without departing from the spirit of my invention, and that certain changes would be desirable if the toaster is to be used for general restaurant purposes.

Figure 1 is a general longitudinal section through the toaster.

Figure 2 is a general transverse section through the toaster.

Figure 3 is a detail section substantially on the line 3—3 of Figure 1.

Figure 4 is a transverse section substantially on the line 4—4 of Figure 1.

Figure 5 is a transverse section similar to Figure 2, illustrating an attachment.

The toaster frame is made up of several elements. It comprises a base 9 which is hollow and open at its bottom, the bottom being normally closed by a bottom pan 90, the flanged edges 10 of which fit against stop flanges 91 on the inside of the base. Projecting upwardly from the ends of the base 9 are end frames 92. Preferably these are permanently connected to the base, and they may be permanently connected together at the top of the frame by a bridge member 93, in order to achieve rigidity. Each end frame is cut out to provide an upright aperture 94 through which the slice passes. The edges of the apertures 94 are turned inwardly to form flanges 96. A table 95 extends from the bottom of one slot 94 to the other, and the slice, as it passes through the toaster, is supported upon or from this table 95.

To guide the toast and to maintain it upright, slice-engaging guide means are provided, extending between the corresponding sides of the apertures 94 at each end. These guides preferably take the form of wires or rods 8. They may be conveniently supported by receiving their ends in the flanges 96, and then bending their ends, as indicated at 80 (Figure 1), to prevent accidental disengagement of the wires. These wires are inclined relative to the path of movement of the slice. By so inclining them, they occupy a different position relative to the slice during each instant of the latter's advance, with the result that the slice is nowhere shielded from the heat for more than an instant, and the slice is uniformerly browned, without white streaks. By inclining the wires downwardly in the direction of feed or advance of the slice, this downward inclination, acting upon the slice as it moves along, serves to press it downwardly and to hold it more securely in engagement with a conveyor means to be described later.

The table 95 and the guides 8 constitute an upright trough, open at both ends, and sufficiently wide to receive a slice of bread to be toasted. The trough might be open at the top, but for convenience of manufacture, ruggedness, and appearance it is preferred that it be closed by the bridge member 93. The frame is completed by a cover 7 of inverted U form in cross section. This fits over flanges 97 of the end frames 92, which are spaced outward from the flanges 96, and at the end of each leg of the U shaped cover 7 provision is made for removably connecting it to the base 9. Downwardly projecting fingers 70, for example, fit within slots provided in the base, whereby the cover is accurately located in position, with its lower edge flush with a horizontal portion of the base. To secure the several parts of the frame together vertical rods 71 are secured, as by welding, within the cover, as indicated at 72, and the ends of these rods project through the base and through the bottom pan 90, and are threaded at their lower ends for the reception of nuts 73. Tubular spacers 74 engage the top of the base and the inner end of the nuts 73 to prevent distortion of the parts by undue tightening of the nuts. These spacer tubes 74 may be frictionally held in place for assembly between their rods 71 and the depending fingers 70, as best seen in Figure 2. Heat insulating feet 99 on the bottom pan support the toaster, and hold the nuts 73 clear of a table whereon the toaster rests.

Removably supported upon the base and extending upwardly therefrom within the cover 7, and between the legs of the latter and the slice guides 8, but spaced from each of the latter, are the electric heating elements 5. These may be of any convenient standard form, for instance, comprising mica sheets across which extend the resistance wires, and they are held in place by means such as the bolts 50, whereby they are supported from the base 9. Thus supported, with the bolts 50 accessible upon removal of the cover 7, they may be readily renewed when burned out. In the arrangement shown the elements are connected in parallel through bridge members 51, and current is supplied to them by appropriate leads, one of which is shown at 52.

Suitable means are carried in the base to advance a slice lengthwise through the trough, referred to above. Such feed means may take a variety of forms. Preferably it is in the form of an endless belt or chain conveyor. Thus spaced sprocket wheels 20 are supported in the base, and carry a chain 2, the upper run of which rests upon and travels lengthwise of the table 95. The lower run is within the hollow base, and is engaged by a third sprocket wheel 21, whereby the chain is advanced. A spur gear 22 is secured to the sprocket wheels 21, to rotate the latter. The chain 2 is preferably sufficiently broad to extend entirely across the trough, and the links thereof are provided with upstanding spikes 29, which will engage the lower edge of a slice placed thereon. Since the slice is urged downwardly by the downward inclination of the guide wires 8, throughout its passage it will be pressed firmly against the spikes 29, and the latter will positively move the slice at the same rate of travel as the chain, through the toaster.

To drive the conveyor 2 I provide an electric motor and reduction gearing, enclosed within the housings 1 and 10 respectively, both mounted upon the bottom pan 90, so as to be removable therewith. The motor shaft is indicated at 11, and the reduction gearing terminates in a gear 12, which, when the bottom pan is positioned within the open bottom of the base, is accurately located to mesh with the driving gear 22 of the chain 2, as is best seen in Figures 1 and 3.

Some persons prefer toast that is light in color, and others prefer darker toast. This can be controlled by controlling the time of exposure to the heating elements, and this in turn can be controlled by regulating the speed of advance of the belt conveyor 2. To this end I provide speed reduction gearing and a selective clutch, interposed between the motor 1 and the driven gear 22. Thus through appropriate gear reduction the gear 23, fast on the shaft 24, is driven at one speed and the gear 25, loose on the shaft 24, is driven at a different speed. A clutch element 26, fast upon the shaft 24, and therefore connected operatively to the gear 23, faces a clutch element 27 which is rotatable with the gear 25, and a shiftable complemental clutch element 28 is movable with the driving pinion 12. Shifting of the element 28 into engagement with the clutch element 26 effects slow feed of the toast, and consequently produces darker toast than when the clutch element 28 is engaged with the clutch element 27, the latter producing lighter toast.

Such shifting is accomplished by convenient means, for instance the yoke 30 carried by the sleeve 31 upon the shaft 32, the shaft having a groove 33 within which is engageable a pin 34 eccentrically carried upon a rock shaft 35, extending exteriorly of the base and upon the outer end of which is mounted a control knob 3. A spring interposed between the sleeve 31 and the shaft 32 permits a slight excess movement of the shaft 32 with relation to the sleeve and clutch element 28, and insures meshing of the clutch jaws, even though when first engaged they may not accurately register. It should be noted that the clutch elements 26 and 27 are shown spaced insufficiently to permit the clutch element 27 to come into a neutral position, although by spacing them more widely this might be permitted, but it is preferable that there be no neutral position, so that the clutch will be moved by the slope of the clutch teeth or by the spring within the sleeve 31 into engagement with one clutch element or the other. An indicator may be provided in association with the control knob 3, and spaced stop elements engageable with a finger 35 on the rock shaft 36 may limit the rotation of the shaft.

Current is supplied to the motor 1 from leads 53, one of which leads through an insulating block 54 on the base 9, and which carries springpressed spaced contacts 55. Only one such contact is shown, the other being in line therewith. Carried by the bottom pan 90 is a further insulating block 56 wherein are mounted spaced contacts 57 (only one of which is shown) cooperating with the contacts 55 and engaging the latter when the bottom pan is accurately positioned by the means previously described. The leads 58, which are directly connected to the motor, extend through the contacts 57, and the motor is therefore in condition for operation only when the bottom pan is in place and the contacts 57 are in engagement with the contacts 55. A suitable switch, generally indicated at 59, controls the supply of current to the heating elements 5, and to the motor through the contacts 55, the motor being energized whenever current is supplied to the heating elements.

Though the heating elements may be exposed only on the side toward the slice, they will nevertheless throw an appreciable amount of heat outwardly, and to lessen the heat thrown upon the cover 7 I provide a heat protective plate 4 at each side of the trough between the heating elements 5 and the cover 7. This provides a dead air space which acts as an insulator, and some circulation of air may occur also if proper openings are provided for this purpose. To secure the heat protective plate 4 in place it may be provided with end channels 40, which tend to stiffen it, and which are received in the channels between the flanges 96 and 97 of the end frames. It is spaced from the heating elements 5 by knobs 41 or similar means contacting the mica of the heating elements.

Preferably there is an extension of the table 95 at at least the feed end of the toaster, and preferably at both ends. Such a table is indicated at 60, its inner end extending into the aperture 94 to rest upon an edge of the end frame. Thence it extends outwardly substantially level with the table 95, and its outer end may be curved back, as indicated at 61, to a point of securement at 62 to the end frames. Alongside each such table 60 I support members 6 of material of low heat conductivity, as Bakelite or wood, and these elements may be grooved to receive the edges of the table 60 and its extension 61. The elements 6 are suitably secured to the end frames, as by the screws 63, and may be decorative in shape and formed to serve as handles for the toaster.

A slice may be positioned thus between the handle members 6 and upon the table 60, projected through the adjacent aperture 94 sufficiently to be engaged by the spikes 23. The spikes draw the slice into the toaster, the inclined slice guides 8 serving to press it downwardly upon the spikes, and it is carried through the toaster to the opposite end at the rate of speed governed by the position of the selective clutch element 28. It is delivered upon the opposite extension 60 and freed from the spikes thereby, and can be lifted off, or if the extension 60 at the discharge end is narrow, it may drop off upon a plate beneath the latter.

It is desirable to oil the shaft bearings of the gearing occasionally, and to accomplish this or to permit inspection of the motor the bottom pan 90 can be disconnected by merely unscrewing the nuts 73 and removing the knobs 3; the cover 7 need not be removed. There are no electrical connections between the motor and the lead-in wires 53, consequently the motor with its gearing is completely separable from the remainder of the toaster with the bottom pan 90.

If it is desired to renew a heating element the cover 7 may be removed by disconnecting the nuts 73 and drawing the cover upwardly. The heat protective plate 4 may then be removed, and the heating elements are completely exposed, as is the securing screw 50. It can then be removed and replaced, the protective plate 4 replaced, and the cover 7, and upon tightening the nuts 73 the toaster is again ready for use.

The frame is preferably ventilated by suitable holes, especially in the bridge member 93 and in the corresponding part of the cover, as indicated at 43. Holes may also be provided in the base, as at 44. To keep toast warm until it is served, a shelf 45 may be provided, having feet 46 receivable in certain holes 43, thus to hold the shelf 45 spaced above the toaster, where it is warmed by warm air escaping through the holes 43, yet not so close as to prevent the escape of such warm air.

In a commercial or restaurant form, the toaster may have multiple troughs and conveyors, and the extension 60 at the feed end, at least, may be sufficiently long that several slices may be placed thereon at a time. In the latter case the conveyor chain 2 would extend along this extension sufficiently to engage and feed all the slices that could be placed upon the extension.

What I claim as my invention is:

1. A bread toaster comprising a frame defining an upright trough open at both ends, a heating element supported in the frame at each side of the trough, a conveyor element movable lengthwise of the trough, along its bottom, means so to move said conveyor, and slice-guiding bars at each side of the trough to hold a slice upright and spaced from the heating elements as it is conveyed along the trough, said bars being inclined, relative to the bottom of the trough, continuously and in the same direction, from end to end of the trough, to urge the slice into engagement with the conveyor.

2. A bread toaster comprising a frame defining an upright trough open at both ends, a heating element supported in the frame at each side of the trough, a conveyor element movable lengthwise of the trough, along its bottom, and having upstanding spikes engageable with the lower edge of a slice resting upon the conveyor, means so to move said conveyor, longitudinally extending bars at each side of the trough disposed to engage and to space from the heating elements a slice resting upon the conveyor, said bars being continuously inclined in one direction from end to end of the trough, and relative to its bottom, to urge the slice continuously into engagement with said spikes.

3. A bread toaster comprising a base, two upstanding end frames mounted thereon and apertured for the passage of a slice, slice-guiding means connecting corresponding sides of such apertures in the respective end frames, to define a slice-receiving trough, a heating element supported from the base, and upstanding alongside of and spaced outwardly from such trough, at each side, an enclosing cover of inverted U form in cross section extending between the end frames, and removably connected to the base at the lower end of each leg, for convenient access to the heating elements, an upright channel open at its upper end, formed on each end frame, at each side thereof, disposed between the cover and the heating element, a heat-protective plate received in such channels, at each side, and held thereon solely by the overlying cover, and means carried by the base to support and advance a slice along the bottom of the trough.

4. A bread toaster comprising a base, two slice-guiding means supported therefrom, extending lengthwise of the base and spaced apart to guide a slice for lengthwise movement, means carried by the base for so moving a slice, a heating element upstanding alongside of and spaced outwardly from each slice-guiding means, and supported from the base, and a cover of inverted U form in cross section enclosing the heating elements and slice-guiding means, a bottom pan removably received in the base, rods secured to the end of the legs of the cover, extending through the base and pan, and threaded at their lower ends, and nuts received on said rods to secure together the cover, base, and pan.

5. A bread toaster comprising a frame defining an upright trough open at both ends, said frame having a hollow base open at its bottom, a heating element supported in the frame at each side of the trough, a conveyor belt mounted in the frame and movable lengthwise of the trough, along its bottom, a gear carried by the base of the frame, and operatively engaged with said belt to drive the latter, a bottom pan disposed in the open bottom of the base, a motor and a driving gear mounted upon said pan, means to secure said pan removably, in definite position, to the base, said driving gear meshing with the belt gear when the pan is thus positioned, and external means to control said motor.

6. A bread toaster comprising a frame defining an upright trough open at both ends, said frame having a hollow base open at its bottom, a heating element supported in the frame at each side of the trough, a conveyor belt mounted in the frame and movable lengthwise of the trough, along its bottom, a gear carried by the base of the frame, and operatively engaged with said belt to drive the latter, a bottom pan disposed in the open bottom of the base, a motor and a driving gear mounted upon said pan, means to secure said pan removably, in definite position, to the base, said driving gear meshing with the belt gear when the pan is thus positioned, external means to control said motor, change-speed gearing and a selective clutch carried by the pan and operatively disposed between the motor and driving gear, and an external clutch control device, whereby the rate of advance of a slice through the trough may be varied.

7. A bread toaster comprising a grade defining an upright trough open at both ends, said frame having a hollow base open at its bottom, a heating element supported in the frame at each side of the trough, a conveyor belt mounted in the frame and movable lengthwise of the trough, along its bottom, a gear carried by the base of the frame, and operatively engaged with said belt to drive the latter, a bottom pan disposed in the open bottom of the base, a motor and a driving gear mounted upon said pan, means to secure said pan removably, in definite position, to the base, said driving gear meshing with the belt gear when the pan is thus positioned, external means to control said motor, a pair of spaced contacts fixedly supported in the base, and adapted for connection to an electric source, and a pair of contacts carried upon the pan, in position to engage the respective first contacts when the pan is secured in position, and electrically connected in the motor circuit.

8. A bread toaster comprising a frame defining an upright trough open at both ends, a heating element supported in the frame at each side of and outwardly from the trough, a conveyor element to support and move a slice lengthwise of the trough, means so to move said conveyor, a table forming an extension of the bottom of the trough, at each end thereof, and upstanding elements of material of low heat conductivity disposed at each side of each table, in prolongation of the sides of the trough, and constituting handles for the toaster.

HARRY R. MITCHELL.